M. G. Ogden,
Scroll Saw.
No. 105,120. Patented July 5, 1870.

Attest.
Chas Pickles
Henry Millward

Inventor.
Marcus G. Ogden
By F. Millward
Attorney

United States Patent Office.

MARCUS G. OGDEN, OF CINCINNATI, OHIO.

Letters Patent No. 105,120, dated July 5, 1870.

IMPROVEMENT IN SCROLL-SAWS.

The Schedule referred to in these Letters Patent and making part of the same

*To all whom it may concern:*

Be it known that I, MARCUS G. OGDEN, of Cincinnati, Hamilton county, State of Ohio, have invented certain new and useful Improvements in Scroll-Saws; and I do hereby declare the following to be a sufficiently full, clear, and exact description thereof, to enable one skilled in the art to which my invention appertains to make and use it, reference being had to the accompanying drawing making part of this specification.

My invention relates principally to the class of scroll-saws in which the saw is extended or stretched by two pivoted levers, which, at the opposite end to the saw, are drawn together, so as to extend the saw, by a tightening device ; and My invention consists—

First, of a peculiar device for connecting the levers to the saw.

Second, of a peculiar device for drawing the levers together at the ends for stretching the saw.

Third, of an adjustable guide for the back of the saw; which can be used in connection with scroll-saws of other construction than the one described.

In the accompanying drawing—

Figure 1:
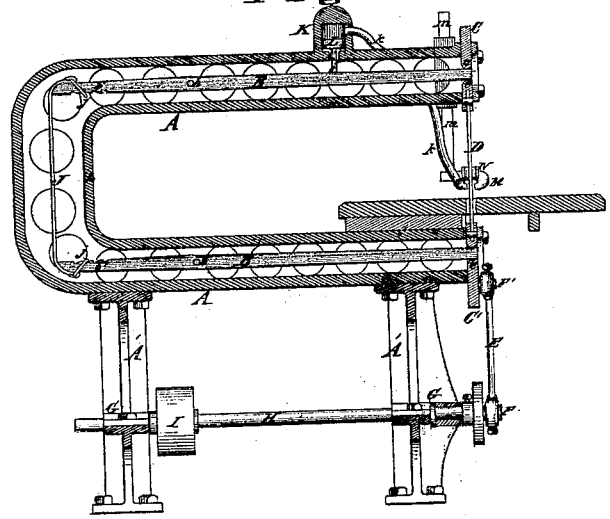
Figure 1 is a sectional elevation of a machine embodying my invention.
Figure 2:
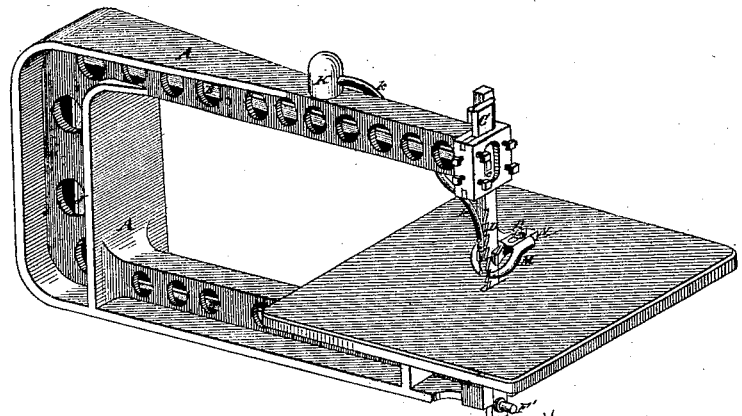
Figure 2 is a perspective view of the same.

A is a tubular U-shaped frame resting upon the legs A A'.

Within this frame the levers B B' are pivoted at b b.

C C' are slides, which are snugly inclosed at the end of the frame, and connected to the saw D by the customary pins in the slides, and side slots in the saw.

The lower slide C' is attached to the driving-shaft by pitman E and wrists F F'.

Bearings G support the driving-shaft H, and the shaft H is operated by pulley I, or otherwise.

Each of the slides C C' is provided with an aperture, c, for the reception of the ends of the levers B B', which are designed to pass entirely through the slides.

The tops and bottoms of the apertures c, which are rectangular in shape, are chamfered on both sides, as shown, in order that the levers will fit the apertures c, in all positions, and also bear in the center of the slides at all times.

This device dispenses with the customary link connection, and is much simpler, and less liable to get out of order.

The reciprocating motion of the saw is not necessarily of great extent, and there is consequently not much motion or wear on the levers or apertures c.

The levers B B' are notched on the inner sides, as shown at b' b', and connected together at this end by strap J, which is provided with a metallic loop, j, at each end, which loops surround the ends of the levers and engage in the notches b'.

The levers are drawn together at this end, in order to stretch the saw at the opposite end, by engaging the loops j in the notches b', as near as possible to the fulcrums b.

K is a blowing cylinder, communicating with the saw-table by rubber tube k.

The cylinder is fitted with a solid piston, L, which is connected to and driven by the lever B, in the manner shown. This blower receives and discharges air through the same tube, and suffices to blow off the dust from the work in the path of the saw.

M is a forked pad, which is connected to the frame A by the sliding and adjustable bar m. This pad serves to keep the stuff from rising with the saw in the upward stroke. It is provided at the rear of the saw with an adjustable guide, N, for steadying and guiding the blade of the saw, being forked as shown, to receive the edge of the blade. It is dovetailed into the pad in the manner shown, and secured when it is adjusted, by means of set-screw n.

The work to be cut is placed upon the table O, which is secured to the U-shaped frame A.

The peculiar shape of the frame gives ample room for large stuff, and enables the machine to occupy but little space.

Being tubular, the frame A incloses the levers, and thus prevents the collection of dirt and dust in the working mechanism. As a slight variation from the exact tubular form, a double-flange girder form, or three-sided form may be employed to inclose the levers B B'.

Claims.

1. The slides C C', when constructed with the chamfered holes c c, and combined with the saw D, pivoted levers B B', and connecting-rod or strap J j, substantially as set forth.

2. In connection with a scroll-saw embodying the pivoted levers B B', the tubular U-shaped frame A, inclosing the levers, in the manner and for the purpose described.

In testimony of which invention I hereunto set my hand.

MARCUS G. OGDEN.

Witnesses:
FRANK MILLWARD,
J. L. WARTMANN.